US011990105B2

(12) United States Patent
Song

(10) Patent No.: US 11,990,105 B2
(45) Date of Patent: May 21, 2024

(54) METHOD AND SYSTEM OF MEASURING DISPLAY PANEL, AND DISPLAY DEVICE

(71) Applicant: HKC CORPORATION LIMITED, Guangdong (CN)

(72) Inventor: Zhenli Song, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 660 days.

(21) Appl. No.: 17/262,124

(22) PCT Filed: Dec. 26, 2018

(86) PCT No.: PCT/CN2018/123973
§ 371 (c)(1),
(2) Date: Jan. 21, 2021

(87) PCT Pub. No.: WO2020/103283
PCT Pub. Date: May 28, 2020

(65) Prior Publication Data
US 2021/0264878 A1 Aug. 26, 2021

(30) Foreign Application Priority Data
Nov. 20, 2018 (CN) .......................... 201811386245.7

(51) Int. Cl.
G09G 5/10 (2006.01)
G01M 11/08 (2006.01)
(Continued)

(52) U.S. Cl.
CPC ............... G09G 5/10 (2013.01); G01M 11/08 (2013.01); G01N 21/59 (2013.01); G02F 1/1309 (2013.01);
(Continued)

(58) Field of Classification Search
CPC ................... G09G 5/10; G09G 3/3607; G09G 2320/0626; G09G 2360/141;
(Continued)

(56) References Cited

U.S. PATENT DOCUMENTS 10,084,150 B1 * 9/2018 Lou ..................... H10K 59/1213
2002/0097371 A1 * 7/2002 Yoshino ............. G01D 5/34715
349/199

(Continued)

FOREIGN PATENT DOCUMENTS

CN 101178488 A 5/2008
CN 102213848 A 10/2011
(Continued)

OTHER PUBLICATIONS

PCT International Search Report; Application No. PCT/CN2018/123973; Aug. 23, 2019; 6 pages.
(Continued)

Primary Examiner — Mohamed K Amara

(57) ABSTRACT

A method and a system of measuring a display panel, and a display panel. The display panel includes a backlight module and a liquid crystal panel. The method of measuring the display panel includes determining a target position on a display panel that meets a preset condition, wherein the target position includes a first target position and a second target position, and a connecting line of the first target position and the second target position is parallel to a row of sub-pixels. The method further includes measuring brightness information at the target position under a constant applied voltage, wherein the brightness information includes brightness information of the backlight module and brightness information of the display panel, and a display efficiency of the display panel is calculated according to the brightness information.

15 Claims, 4 Drawing Sheets

(51) Int. Cl.
*G01N 21/59* (2006.01)
*G02F 1/13* (2006.01)
*G09G 3/36* (2006.01)
*G01N 21/95* (2006.01)

(52) U.S. Cl.
CPC ... *G09G 3/3607* (2013.01); *G01N 2021/9513* (2013.01); *G09G 2320/0626* (2013.01); *G09G 2360/141* (2013.01)

(58) Field of Classification Search
CPC .. G09G 2320/0233; G09G 3/006; G09G 3/36; G01M 11/08; G01M 11/00; G01N 21/59; G01N 2021/9513; G02F 1/1309; G02F 2203/69
See application file for complete search history.

(56) References Cited

U.S. PATENT DOCUMENTS

| | | | | |
|---|---|---|---|---|
| 2003/0048261 A1* | 3/2003 | Yamamoto | ............ | G06F 3/0412 345/173 |
| 2005/0140640 A1* | 6/2005 | Oh | ............ | G09G 3/3406 345/102 |
| 2006/0132472 A1* | 6/2006 | Peeters | ............ | G09G 3/02 345/204 |
| 2007/0236484 A1* | 10/2007 | Oh | ............ | G09G 3/3614 345/204 |
| 2010/0127264 A1* | 5/2010 | Bang | ............ | H10K 50/828 438/151 |
| 2010/0188603 A1* | 7/2010 | Ikeda | ............ | G02F 1/1309 349/62 |
| 2010/0302194 A1* | 12/2010 | Park | ............ | H10K 50/828 345/82 |
| 2012/0075274 A1* | 3/2012 | Ueno | ............ | G09G 3/3426 345/207 |
| 2014/0009505 A1* | 1/2014 | Moon | ............ | G09G 3/006 345/690 |
| 2014/0092001 A1* | 4/2014 | Kikkawa | ............ | G09G 3/3406 345/102 |
| 2014/0184577 A1* | 7/2014 | Kim | ............ | G02B 26/005 345/207 |
| 2014/0191118 A1* | 7/2014 | Dai | ............ | G02F 1/1309 250/227.11 |
| 2015/0187283 A1* | 7/2015 | Jiang | ............ | G09G 3/342 345/690 |
| 2015/0339987 A1* | 11/2015 | Han | ............ | G09G 3/3696 345/89 |
| 2016/0154269 A1* | 6/2016 | Fukuoka | ............ | G09G 3/34 345/87 |
| 2016/0170522 A1* | 6/2016 | Slobodin | ............ | G06F 3/04166 345/174 |
| 2017/0140732 A1* | 5/2017 | Kim | ............ | G02B 5/08 |
| 2017/0352317 A1* | 12/2017 | Huang | ............ | G02F 1/134309 |
| 2018/0188563 A1 | 7/2018 | Yao et al. | | |
| 2018/0293945 A1* | 10/2018 | Wang | ............ | G09G 3/3291 |
| 2019/0101779 A1* | 4/2019 | Peng | ............ | G02F 1/133512 |
| 2020/0264486 A1* | 8/2020 | Kadono | ............ | G02F 1/1524 |
| 2021/0210482 A1* | 7/2021 | Zhang | ............ | H01L 27/1244 |

FOREIGN PATENT DOCUMENTS

| | | | | |
|---|---|---|---|---|
| CN | 104516109 A | 4/2015 | | |
| CN | 104849922 A | 8/2015 | | |
| CN | 105334649 A | 2/2016 | | |
| CN | 105717674 A | 6/2016 | | |
| CN | 106773172 A | 5/2017 | | |
| CN | 108957806 A | 12/2018 | | |
| CN | 109164610 A | 1/2019 | | |
| CN | 109754770 A | * 5/2019 | ............ | G09G 5/10 |
| JP | 2001091924 A | 4/2001 | | |
| KR | 100804119 B1 | * 2/2008 | ............ | G09G 3/36 |
| KR | 20080067232 A | * 7/2008 | ............ | G02F 1/133 |

OTHER PUBLICATIONS

PCT Written Opinion of the International Searching Authority; Application No. PCT/CN2018/123973; Aug. 23, 2019; 3 pages.

\* cited by examiner

METHOD AND SYSTEM OF MEASURING DISPLAY PANEL, AND DISPLAY DEVICE

CROSS-REFERENCE TO RELATED APPLICATIONS

The present application is a U.S. National Stage of International Patent Application No. PCT/CN2018/123973, filed on Dec. 26, 2018, which claims priority to Chinese Patent Application No. 201811386245.7 filed on Nov. 20, 2018 both of which are incorporated herein by reference as if reproduced in their entirety.

TECHNICAL FIELD

The present application relates to the field of display technology, and more particularly to a method and a system of measuring a display panel, and a display device.

BACKGROUND

The statements herein only provide background information related to the present application, and do not necessarily constitute prior art. With the continuous development of liquid crystal display (LCD) technology, liquid crystal panels are widely used in televisions, display screens of large conference venues, personal computer (PC) machine displays, and other fields due to their good display effects. Currently, commonly used LCD panel display modes include twisted nematic (TN), in-plane switching (IPS), and vertical alignment (VA).

Due to the uneven distribution of the electron cloud density of the liquid crystal molecules on the long axis and the short axis, optical and electrical anisotropy of the liquid crystal molecules is caused; in the entire display process, the liquid crystal acts as a voltage-controlled light valve, which directly affects the light transmittance. Conventional display panel measuring methods require multiple disassembly of the module or re-attachment of the polarizers, and the measurement process is cumbersome and takes a long time, resulting in low data accuracy, low reliability, and low work efficiency.

SUMMARY

An object of the present application is to provide a method of measuring a display panel, including but not limited to solving the technical problem of the measurement process being cumbersome and taking a long time, resulting in low data accuracy, low reliability, and low work efficiency.

The technical solution adopted by embodiments of the present application is the measuring method which includes determining a target position on a display panel that meets a preset condition, measuring brightness information at the target position under a constant applied voltage, and calculating a display efficiency of the display panel according to the brightness information.

In an embodiment, the step of determining a target position on a display panel that meets a preset condition comprises determining a first target position and a second target position on the display panel, determining that a connecting line between the first target position and the second target position is parallel to a row of sub-pixels, and determining a distance between the first target position and the second target position is within a preset distance range.

In an embodiment, the step of calculating a display efficiency of the display panel according to the brightness information comprises calculating a first display efficiency corresponding to the first target position according to brightness information of the first target position, calculating a second display efficiency corresponding to the second target position according to brightness information of the second target position, and calculating an average value of the first display efficiency and the second display efficiency to acquire the display efficiency of the display panel.

In an embodiment, the step of measuring brightness information at the target position under a constant applied voltage comprises measuring a first backlight brightness and a first display panel brightness at the first target position, wherein the first backlight brightness is a backlight brightness corresponding to the first target position when a liquid crystal panel is removed, and the first display panel brightness is a brightness at the first target position of the display panel when the display panel retains an upper polarizer and a lower polarizer; measuring a second backlight brightness and a second display panel brightness at the second target position, wherein the second backlight brightness is a backlight brightness corresponding to the second target position when a liquid crystal panel is removed, and the second display panel brightness is a brightness at the second target position of the display panel when the display panel retains an upper polarizer and a lower polarizer; measuring a third display panel brightness at the first target position, wherein the third backlight brightness is a display panel brightness when the display panel removes an upper polarizer at the first target position; measuring a fourth display panel brightness at the first target position, wherein the fourth backlight brightness is a display panel brightness when the display panel removes a lower polarizer at the second target position; measuring a fifth display panel brightness at the first target position, wherein the fifth display panel brightness is a display panel brightness when the display panel removes an upper polarizer and a lower polarizer at the first target position; and measuring a sixth display panel brightness at the first target position, wherein the sixth display panel brightness is a display panel brightness when the display panel removes an upper polarizer and a lower polarizer at the second target position.

In an embodiment, the step of calculating a display efficiency of the display panel according to the brightness information comprises calculating a first light transmittance according to a first backlight brightness and a first display panel brightness, calculating a second light transmittance according to the first backlight brightness and a third display panel brightness, calculating a third light transmittance according to a second backlight brightness and a fourth display panel brightness, calculating a fourth light transmittance according to the first backlight brightness and a fifth display panel brightness, calculating a fifth light transmittance according to the second backlight brightness and a second display panel brightness, calculating a sixth light transmittance according to the second backlight brightness and a sixth display panel brightness, calculating the display efficiency corresponding to the first target position according to the first light transmittance, the second light transmittance, the third light transmittance, and the fourth light transmittance, and calculating the display efficiency corresponding to the second target position according to the fifth light transmittance, the second light transmittance, the third light transmittance, and the sixth light transmittance.

In an embodiment, a calculating formula of calculating the display efficiency corresponding to the first target position according to the first light transmittance, the second light transmittance, the third light transmittance, and the fourth light transmittance is as follows:

$$\eta_{LC,1} = \frac{T_1 \times T_4}{T_2 \times T_3 \times 2}$$

wherein $\eta_{LC,1}$ represents the display efficiency corresponding to the first target position, $T_1$ represents the first light transmittance, $T_2$ represents the second light transmittance, $T_3$ represents the third light transmittance, and $T_4$ represents the fourth light transmittance, and a calculating formula for calculating the display efficiency corresponding to the second target position according to the fifth light transmittance, the second light transmittance, the third light transmittance, and the sixth light transmittance is as follows:

$$\eta_{LC,2} = \frac{T_5 \times T_6}{T_2 \times T_3 \times 2}$$

wherein $\eta_{LC,2}$ represents the display efficiency corresponding to the second target position, $T_5$ represents the fifth light transmittance, $T_2$ represents the second light transmittance, $T_3$ represents the third light transmittance, and $T_6$ represents the sixth light transmittance.

A calculating formula of calculating the display efficiency of the display panel according to the display efficiency corresponding to the first target position and the display efficiency corresponding to the second target position is as follows:

$$\eta_{LC} = \frac{\eta_{LC,1} + \eta_{LC,2}}{2}$$

wherein $\eta_{LC}$ represents the display efficiency of the display panel.

In an embodiment, the step of measuring brightness information at the target position under a constant applied voltage comprises measuring a backlight brightness and a display panel brightness at the target position.

In an embodiment, after the step of measuring a backlight brightness and a display panel brightness at the target position comprises calculating a light transmittance at the target location according to the backlight brightness and the display panel brightness at the target location, and calculating a display efficiency corresponding to the target position according to the light transmittance at the target position.

In an embodiment, the backlight brightness is a normal brightness of a backlight, the normal brightness of the backlight is a light emission direction perpendicular to a plane of the backlight, and the display panel brightness is a brightness produced by emitted light perpendicular to the display panel.

In an embodiment, the target position comprises a point at a center of the display panel, two points at a first distance from the center, or four points at a second distance from the center, and a connecting line of the two points or the four points is parallel to the row of sub-pixels.

In an embodiment, marking a center of the display panel; then fixing and recording a distance of the target position relative to the center of the display panel; then setting a preset constant time until the backlight is stabilized; finally starting measuring.

In an embodiment, the measuring method includes determining a first target position and a second target position on the display panel, and determining a distance between the first target position and the second target position is within a preset distance range, measuring a backlight brightness information of the first target position and a display panel brightness under a constant applied voltage, and measuring a backlight brightness and a display panel brightness at the second target position under a constant applied voltage, calculating a first light transmittance at the first target position according to the backlight brightness information and the display panel brightness of the first target position, calculating a second light transmittance at the second target position according to the backlight brightness and the display panel brightness of the second target position, and calculating the display efficiency of the display panel according to the first light transmittance and the second light transmittance.

Another object of the present application is to provide a system of measuring a display panel, which includes a positioning device configured for determining a target position on a display panel that meets a preset condition, a measuring device configured for measuring brightness information at the target position under a constant applied voltage, and a calculating device configured for calculating a display efficiency of the display panel according to the brightness information.

In an embodiment, the positioning device is further configured for determining a first target position and a second target position on the display panel, and determining a connecting line of the first target position and the second target position is parallel to a row of sub-pixels, and determining a distance between the first target position and the second target position is within a preset distance range.

In an embodiment, the measuring device is further configured for measuring a first backlight brightness and a first display panel brightness at the first target position, wherein the first backlight brightness is a backlight brightness corresponding to the first target position when a liquid crystal panel is removed, and the first display panel brightness is a brightness at the first target position of the display panel when the display panel retains an upper polarizer and a lower polarizer; measuring a second backlight brightness and a second display panel brightness at the second target position, wherein the second backlight brightness is a backlight brightness corresponding to the second target position when a liquid crystal panel is removed, and the second display panel brightness is a brightness at the second target position of the display panel when the display panel retains an upper polarizer and a lower polarizer; measuring a third display panel brightness at the first target position, wherein the third backlight brightness is a display panel brightness when the display panel removes an upper polarizer at the first target position; measuring a fourth display panel brightness at the first target position, wherein the fourth backlight brightness is a display panel brightness when the display panel removes a lower polarizer at the second target position; measuring a fifth display panel brightness at the first target position, wherein the fifth display panel brightness is a display panel brightness when the display panel removes an upper polarizer and a lower polarizer at the first target position; and measuring a sixth display panel brightness at the first target position, wherein the sixth display panel brightness is a display panel brightness when the display panel removes an upper polarizer and a lower polarizer at the second target position.

In an embodiment, the calculating device is further configured for calculating a first display efficiency corresponding to the first target position according to brightness information of the first target position, calculating a second display efficiency corresponding to the second target position according to brightness information of the second target position, and calculating an average value of the first display efficiency and the second display efficiency to acquire the display efficiency of the display panel.

A further object of the present application is to provide a display device, which includes a display panel, a memory, a processor, and a computer program stored in the memory and operating on the processor, wherein the processor performs the method of measuring the display device when operating the computer program.

The embodiment of the present application also provides a computer-readable storage medium. The computer-readable storage medium stores a computer program, and when the computer program is executed by a processor, the steps of the above-mentioned method of measuring the display panel are realized.

The method and the system of measuring the display panel and the display device are provided by embodiments of the present application, for example, by determining a target position on a display panel that meets a preset condition, measuring brightness information at the target position under a constant applied voltage, and calculating a display efficiency of the display panel according to the brightness information. The technical problem including the conventional display panel measuring methods requiring multiple disassembly of the module or re-attachment of the polarizers, and the measurement process being cumbersome and taking a long time, resulting in low data accuracy, low reliability, and low work efficiency, is solved.

BRIEF DESCRIPTION OF THE DRAWINGS

In order to explain the embodiments of the present application more clearly, a brief introduction regarding the accompanying drawings, used for describing the embodiments of the present application or the prior art, is given below. It is obvious that the accompanying drawings described as follows are only some embodiments of the present application. For those skilled in the art, other drawings can also be obtained according to the current drawings on the premise of paying no creative labor.

DETAILED DESCRIPTION

In order to make the purpose, the technical solution, and the advantages of the present application clearer and more understandable, the present application will be further described in detail below with reference to the accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component. In the description of the present application, it should be understood that, directions or location relationships indicated by terms such as "up", "down", "left", "right" and so on are the directions or location relationships shown in the accompanying figures, which are only intended to describe the present application conveniently and to simplify the description, and do not indicate or imply that an indicated device or component must have specific locations or be constructed and manipulated according to specific locations. Therefore, these terms should not be considered as limiting to the present application. In addition, the terms "the first" and "the second" are only used in descriptive purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

In order to illustrate the technical solutions described in the present application, detailed descriptions are given below in conjunction with specific drawings and embodiments.

Figure 1:
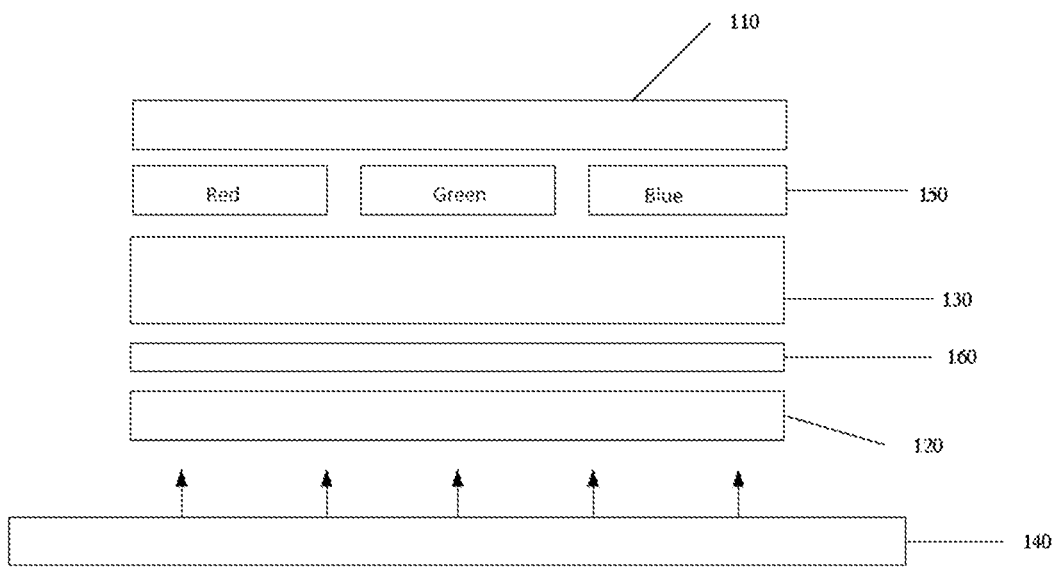
FIG. 1 is a schematic structural diagram of a display panel provided by an example of the present application.

As shown in FIG. 1, an example of the present application provides a schematic structural diagram of a display panel, which includes an upper polarizer 110, a lower polarizer 120, a liquid crystal layer 130, and a backlight module 140. The display panel also includes a color filter glass 150 and an array glass 160. The color filter glass 150 is disposed between the upper polarizer 110 and the liquid crystal layer 130, the liquid crystal layer 130 is disposed between the color filter glass 150 and the array glass 160, the lower polarizer 120 is arranged under the array glass 160, and the backlight module 140 is arranged under the lower polarizer 120.

In an embodiment using the vertical alignment mode liquid crystal display panel as an example, when the display panel is not applied with voltage, the liquid crystal will not be deflected, and the direction of the light passing through the liquid crystal layer will not change. Therefore, the light transmission directions of the upper polarizer and the lower polarizer are perpendicular to each other, and no light passes through the upper polarizer and the lower polarizer, such that after the light of the backlight module passes through the upper polarizer and lower polarizer, the display panel is in a dark state. After a voltage is applied, the liquid crystal is deflected along the alignment direction under the action of an electric field to generate polarized light, wherein a part of the light can pass through the upper polarizer and lower polarizer, and the display panel will be bright after the light passes through the upper polarizer and lower polarizer. In the whole process, the liquid crystal layer functions as a voltage-controlled light valve, which has an important influence on the light transmittance, therefore, the liquid crystal affects the display efficiency of the display panel.

Figure 2:
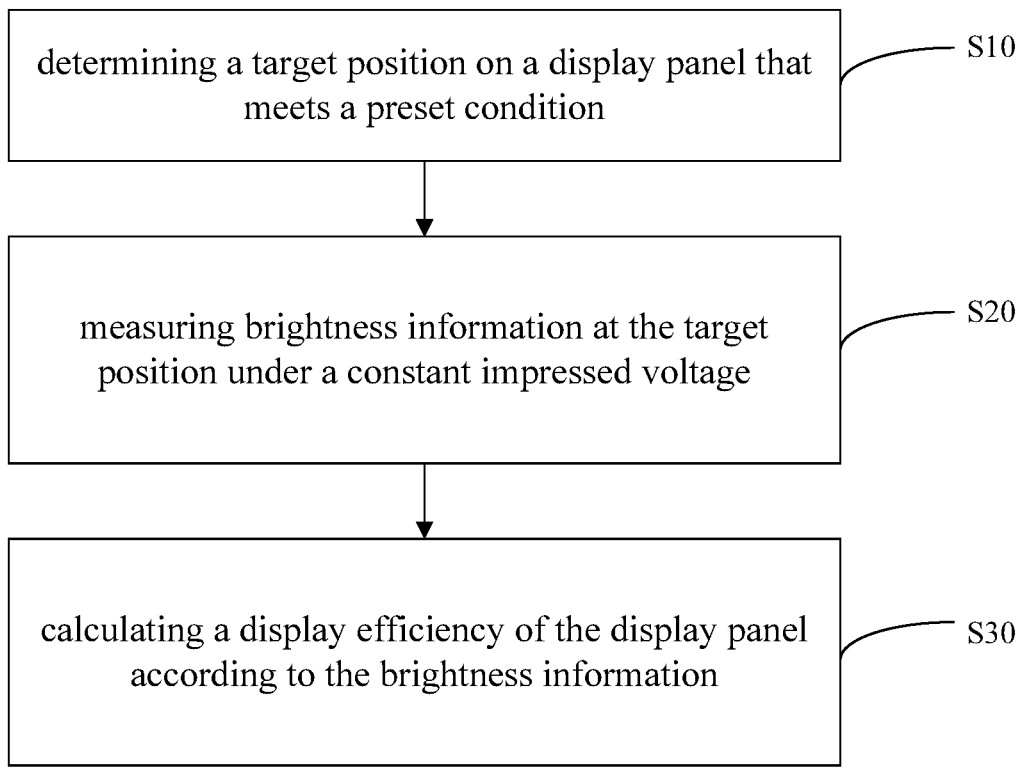
FIG. 2 is a schematic flowchart of a method of measuring a display panel provided by an embodiment of the present application.

As shown in FIG. 2, an embodiment of the present application provides a method of measuring a display panel. The display panel can include an upper polarizer, a lower polarizer, a liquid crystal layer, and a backlight module. The measuring method includes in step S10: determining a target position on the display panel that meets a preset condition.

Figure 3:
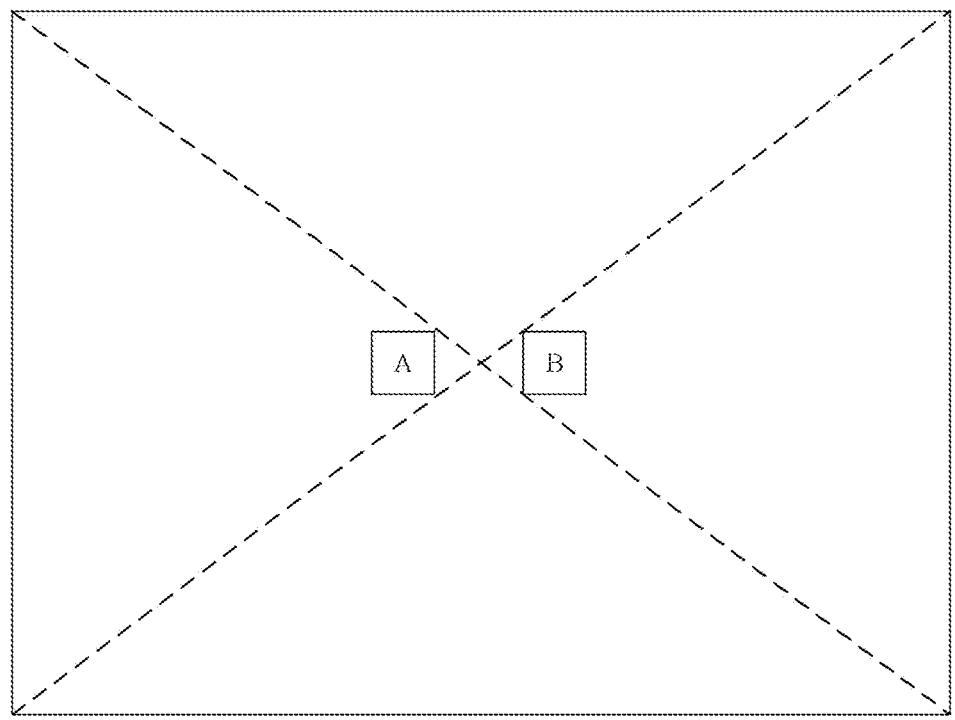
FIG. 3 is a schematic diagram of a target position provided by an embodiment of the present application.

In an embodiment, a point at the center position of the display panel can be selected as the target position. Alternatively, two points at a first distance from the center position or four points at a second distance from the center position can be selected to determine the target position. The line connecting the two points or four points is parallel to the row of sub-pixels. The preset condition includes determining if one point is selected as the target position, selecting a position less than or equal to the preset distance from the center point of the display panel, or if two or more points are selected, the selected points are on a line, and the line of all points is parallel to the row sub-pixels of the pixel array. Among which, the center point of the display panel is located on the line of all points, located on an extension line of the connecting line, or the distance between the connecting line and the center point of the display panel is less than or equal to the preset distance. The preset distance can be set according to the pixel array of the display panel, and the smaller the distance, the better. As shown in FIG. 3, taking two points A and B as an example, since the display panel brightness may have uneven brightness, the smaller the distance between the two points, the better. The light source of the backlight module is parallel to the row of sub-pixels and the row of sub-pixels is arranged in the lamp group, so the two selected points must be on the same horizontal line to eliminate the influence of the backlight. The specific target positions of the two points can also be determined according to the setting of the light source of the backlight module.

In an embodiment, determining the target position on the display panel that meets a preset condition includes determining a first target position and a second target position on the display panel, and a connecting line to the first target position and the second target position being parallel to a row of sub-pixels, and a distance between the first target position and the second target position being within a preset distance range.

In an embodiment, the connecting line between the first target position and the second target position is parallel to the row of sub-pixels to ensure that the two target positions are not affected by the brightness of the backlight module. The distance between the two target positions is within the range of the preset distance, because the smaller the distance the higher the accuracy. The preset distance can be specifically set according to the specific size of the display panel or the brightness of the backlight.

The measuring method in step S20 includes measuring brightness information at the target position under a constant applied voltage.

In an embodiment, the applied voltage is a constant value, so that the liquid crystal is kept in the same state to measure the brightness information. The 255 gray scale state can be selected to measure the brightness information. During the brightness measuring process, the brightness of the backlight module remains the same.

In an embodiment, measuring brightness information at the target position under a constant applied voltage includes measuring a first backlight brightness and a first display panel brightness at the target position.

In an embodiment, the backlight brightness is a normal brightness of a backlight, and the normal brightness of the backlight is a light emission direction perpendicular to a plane of the backlight. The display panel brightness is a brightness produced by emitted light perpendicular to the display panel.

In an embodiment, after measuring a backlight brightness and a display panel brightness at the target position includes calculating a light transmittance at the target location according to the backlight brightness and the display panel brightness at the target location, and calculating a display efficiency corresponding to the target position according to the light transmittance at the target position.

In an embodiment, the formula for calculating the light transmittance is:

$$T = L_1 / L_0 \tag{1}$$

Among them, T represents the transmittance, $L_1$ represents the display panel brightness, and $L_0$ represents the backlight brightness.

In an embodiment, the measuring brightness information at the target position under a constant applied voltage includes measuring a first backlight brightness and a first display panel brightness at a first target position, wherein the first backlight brightness is a backlight brightness corresponding to the first target position when a liquid crystal panel is removed, and the first display panel brightness is a brightness at the first target position of a display panel when the first display panel retains an upper polarizer and a lower polarizer; measuring a second backlight brightness and a second display panel brightness at a second target position, wherein the second backlight brightness is a backlight brightness corresponding to the second target position when a liquid crystal panel is removed, and the second display panel brightness is a brightness at the second target position of a display panel when the display panel retains an upper polarizer and a lower polarizer; measuring a third display panel brightness at the first target position, wherein a third display panel brightness is a display panel brightness when the display panel removes an upper polarizer at the first target position; measuring a fourth display panel brightness at the first target position, wherein a fourth display panel brightness is a display panel brightness when the display panel removes a lower polarizer at the second target position; measuring a fifth display panel brightness at the first target position, wherein the fifth display panel brightness is a display panel brightness when the display panel removes an upper polarizer and a lower polarizer at the first target position; and measuring a sixth display panel brightness at the first target position; wherein the sixth display panel brightness is a display panel brightness when the display panel removes an upper polarizer and a lower polarizer at the second target position.

The first target position and the second target position are positions selected on the display panel to measure the efficiency of the display panel. The backlight brightness is a brightness generated by the emitted light perpendicular to the backlight plane provided by the backlight module under a constant voltage. The display panel brightness is a brightness generated by the light source provided by the backlight module perpendicular to the liquid crystal panel under a constant voltage.

In an embodiment, two target positions, points A and B, are selected, the display panel is disassembled twice, and the relevant brightness information at the two target positions is measured at the same time. Before disassembling, the distance between point A and point B relative to the center of the display panel is measured in order to determine whether the distance between two points is within the preset distance range and to ensure the accuracy of the measuring. The smaller the distance between the two points than the higher the accuracy of the measuring is. The preset distance can be set according to the specific backlight group setting and the size of the display panel, and the display panel brightness is measured at point A and point B at the same time. The first disassembly and assembly process includes the liquid crystal panel, which includes an upper polarizer, a color filter glass, a liquid crystal layer, an array glass, and a lower polarizer, removing the liquid crystal panel and measuring the backlight brightness of the backlight corresponding to point A and point B at the same time, and removing the upper polarizer of the liquid crystal panel corresponding to point A and the lower polarizer of the liquid crystal panel corresponding to point B after the measuring is finished. After which assembling the liquid crystal panel back to the display panel and measuring the display panel brightness at points A and B at the same time takes place. The second disassembly and assembly process includes removing the liquid crystal panel and measuring the backlight brightness at points A and B at the same time, removing the upper polarizers and the lower polarizers of both points A and B, and after the measuring is finished, assembling the liquid crystal panel back to the display panel and measuring the display panel brightness at points A and B, and then calculating the efficiency of the display panel. By measuring the brightness information of two points, the disassembly process is shortened, the measuring time is saved, the work efficiency is improved, the problem of light leakage or position change of the polarizer due to the disassembly process is avoided, and the measuring accuracy and the accuracy of data processing are improved.

If there is a small difference in the backlight brightness corresponding to point A and point B, during the measuring process, the backlight brightness of the two points are measured separately, and the small error can be ignored in the calculation process.

In an embodiment, the center of the display panel is marked and the distances of the target positions A and B relative to the center of the display panel are fixed and recorded, then setting a preset constant time until the backlight is stabilized, and finally starting the measuring. Such as, a constant time value can be within the range of 10-30 minutes to ensure consistent measuring environmental conditions and reduce measuring errors.

The measuring method in step S30 includes calculating a display efficiency of the display panel according to the brightness information.

In an embodiment, the brightness information includes the brightness of the backlight corresponding to the target position and the display panel brightness at the target position of the display panel. The display panel brightness is the brightness of the light emitted by the backlight module passing through the upper and lower polarizers and passing through the liquid crystal layer. The light transmittance is calculated according to the brightness information, and the display efficiency of the display panel is calculated according to light transmittance.

In an embodiment, the step of calculating a display efficiency of the display panel according to the brightness information includes:
calculating a first light transmittance according to a first backlight brightness and a first display panel brightness, calculating a second light transmittance according to the first backlight brightness and a third display panel brightness, calculating a third light transmittance according to a second backlight brightness and a fourth display panel brightness, calculating a fourth light transmittance according to the first backlight brightness and a fifth display panel brightness, calculating a fifth light transmittance according to the second backlight brightness and a second display panel brightness, calculating a sixth light transmittance according to the second backlight brightness and a sixth display panel brightness, calculating a display efficiency corresponding to a first target position according to the first light transmittance, the second light transmittance, the third light transmittance, and the fourth light transmittance, and calculating the display efficiency corresponding to a second target position according to the fifth light transmittance, the second light transmittance, the third light transmittance, and the sixth light transmittance.

Figure 4:
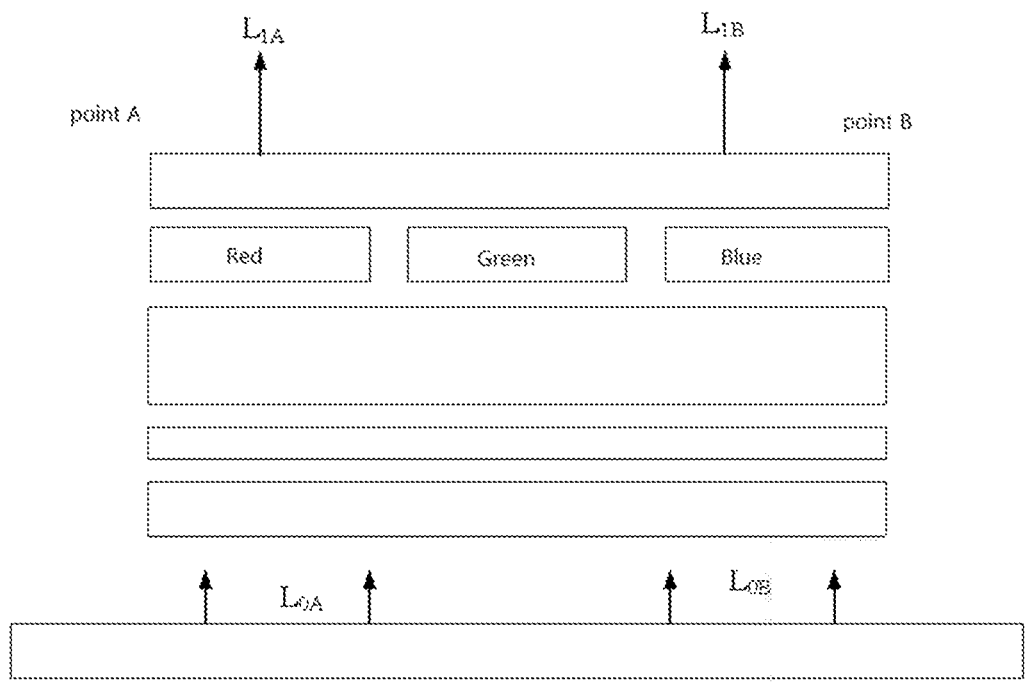
FIG. 4 is a schematic structural diagram of a display panel when measuring different brightness information provided by an embodiment of the present application.

In an embodiment, as shown in FIG. 4, point A is the first target position, and point B is the second target position. The brightness of the first display panel $L_{1A}$ at point A and the second display panel brightness $L_{1B}$ at point B, when the liquid crystal layer, the upper polarizer and the lower polarizer are retained, is measured. The first backlight brightness $L_{0A}$, corresponding to point A and the second backlight brightness LOB corresponding to point B, when the liquid crystal panel is removed is measured, such that the first light transmittance $T_1$ of point A can be calculated as:

$$T_1 = L_{1A}/L_{0A}. \qquad (2)$$

The fifth light transmittance $T_5$ at point B is:

$$T_5 = L_{1B}/L_{0B}. \qquad (3)$$

Figure 5:
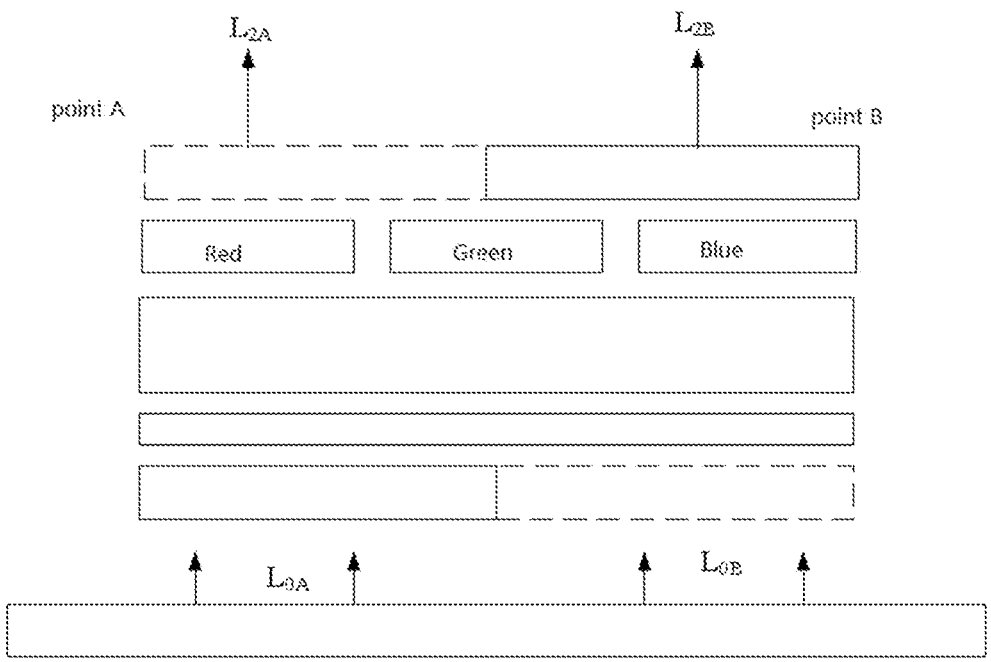
FIG. 5 is another schematic structural diagram of a display panel when measuring different brightness information provided by an embodiment of the present application.

In an embodiment, as shown in FIG. 5, measuring the third display panel brightness $L_{2A}$ corresponding to point A when the upper polarizer of the liquid crystal panel is removed, and the second light transmittance $T_2$ at point A according to the third display panel brightness $L_{2A}$ and the first backlight brightness $L_{0A}$ corresponding to point A is calculated as:

$$T_2 = L_{2A}/L_{0A}. \qquad (4)$$

Measuring the fourth display panel brightness $L_{2B}$ corresponding to point B when the lower polarizer of the liquid crystal panel is removed, and the third light transmittance $T_3$ at point B according to the fourth display panel brightness $L_{2B}$ and the second backlight brightness $L_{0B}$ corresponding to point B is calculated as:

$$T_3 = L_{2B}/L_{0B}. \qquad (5)$$

Figure 6:
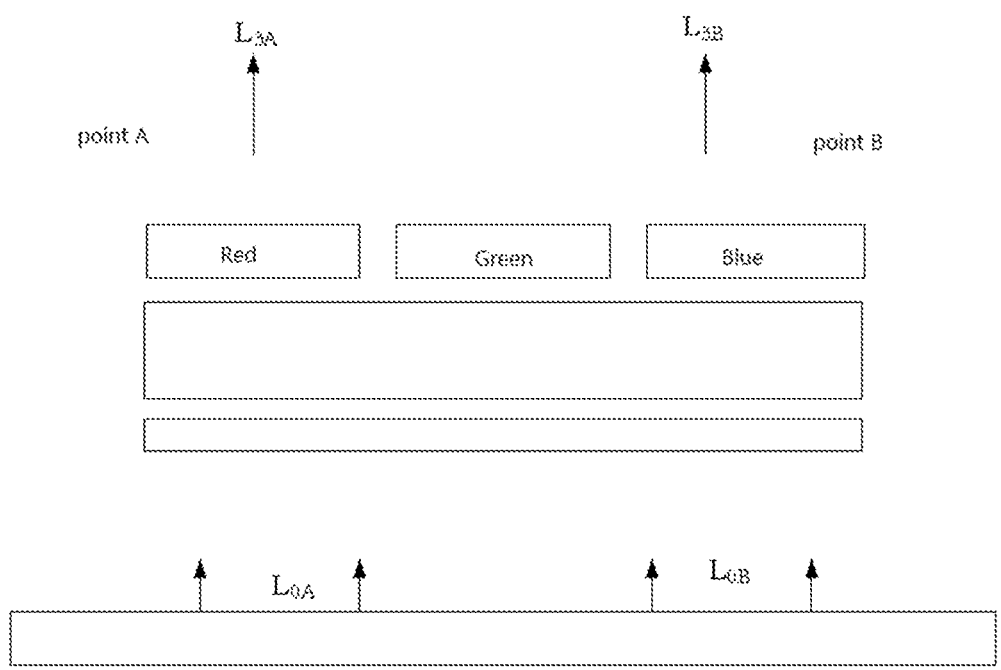
FIG. 6 is another schematic structural diagram of a display panel when measuring different brightness information provided by an embodiment of the present application.

In an embodiment, as shown in FIG. 6, measuring the fifth display panel brightness $L_{3A}$ corresponding to point A when the upper and lower polarizers of the liquid crystal panel are removed, such that the fourth light transmittance $T_4$ of point A can be calculated as:

$$T_4 = L_{3A}/L_{0A}. \tag{6}$$

Measuring the sixth display panel brightness $L_{3B}$ corresponding to point B when the upper and lower polarizers of the liquid crystal panel are removed, such that the sixth light transmittance $T_6$ of point A can be calculated as:

$$T_6 = L_{3B}/L_{0B}. \tag{7}$$

In an embodiment, the display efficiency corresponding to the first target position according to the first light transmittance, the second light transmittance, the third light transmittance, and the fourth light transmittance may be calculated using the formula:

$$\eta_{LC,1} = \frac{T_1 \times T_4}{T_2 \times T_3 \times 2}. \tag{8}$$

Among which, $\eta_{LC,1}$ represents the display efficiency corresponding to the first target position. That is, the display efficiency corresponding to the position at point A.

In an embodiment, the display efficiency corresponding to the second target position according to the fifth light transmittance, the second light transmittance, the third light transmittance, and the sixth light transmittance may be calculated using the formula:

$$\eta_{LC,2} = \frac{T_5 \times T_6}{T_2 \times T_3 \times 2}. \tag{9}$$

Among which, $\eta_{LC,2}$ represents the display efficiency corresponding to the second target position. That is, the display efficiency corresponding to the position at point B.

In an embodiment, the display efficiency of the display panel according to the display efficiency corresponding to the first target position and the display efficiency corresponding to the second target position, may be calculated using the formula:

$$\eta_{LC} = \frac{\eta_{LC,1} + \eta_{LC,2}}{2}. \tag{10}$$

Among which, $\eta_{LC}$ represents the display efficiency of the display panel.

In an embodiment, the method of measuring display efficiency is applied to a display panel. The display panel can include an upper polarizer, a lower polarizer, a liquid crystal layer, and a backlight module. The measuring method includes determining a first target position and a second target position on the display panel, determining a distance between the first target position and the second target position being within a preset distance range, measuring a backlight brightness information of the first target position and a display panel brightness under a constant applied voltage, and measuring a backlight brightness and a display panel brightness at the second target position under a constant applied voltage. The measuring method further includes calculating a first light transmittance at the first target position according to the backlight brightness information and the display panel brightness of the first target position, calculating a second light transmittance at the second target position according to the backlight brightness and the display panel brightness of the second target position, and calculating the display efficiency of the display panel according to the first light transmittance and the second light transmittance.

Figure 7:
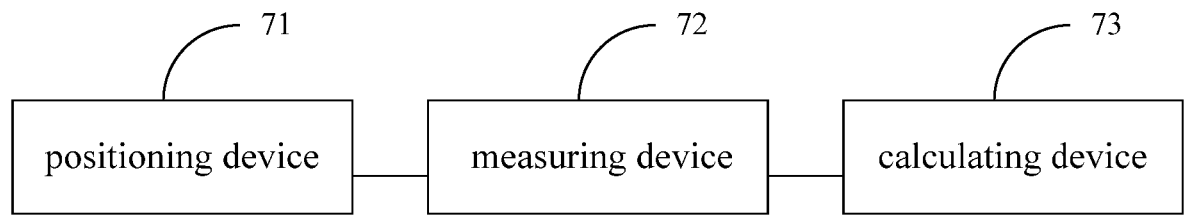
FIG. 7 is a schematic structural diagram of a system of measuring a display panel provided by an embodiment of the present application.

As shown in FIG. 7, an embodiment of the present application provides a system of measuring a display panel, which includes a positioning device 71 configured for determining a target position on a display panel that meets a preset condition, a measuring device 72 configured for measuring brightness information at the target position under a constant applied voltage, and a calculating device 73 configured for calculating a display efficiency of the display panel according to the brightness information.

In an embodiment, the positioning device 71 is further configured for determining a first target position and a second target position on the display panel, determining a connecting line of the first target position and the second target position is parallel to a row of sub-pixels, and determining a distance between the first target position and the second target position satisfies a first condition.

In an embodiment, the measuring device 72 is further configured for measuring a first backlight brightness and a first display panel brightness at the first target position, wherein the first backlight brightness is a backlight brightness corresponding to the first target position when a liquid crystal panel is removed, and a first display panel brightness is a brightness at the first target position of the display panel when the display panel retains an upper polarizer and a lower polarizer; measuring a second backlight brightness and a second display panel brightness at the second target position, wherein the second backlight brightness is a backlight brightness corresponding to the second target position when a liquid crystal panel is removed, and the second display panel brightness is a brightness at the second target position of the display panel when the display panel retains an upper polarizer and a lower polarizer; measuring a third display panel brightness at the first target position, wherein a third display panel brightness is a display panel brightness when the display panel removes an upper polarizer at the first target position; measuring a fourth display panel brightness at the first target position, wherein a fourth display panel brightness is a display panel brightness when the display panel removes a lower polarizer at the second target position; measuring a fifth display panel brightness at the first target position, wherein the fifth display panel brightness is a display panel brightness when the display panel removes an upper polarizer and a lower polarizer at the first target position; and measuring a sixth display panel brightness at the first target position, wherein the sixth display panel brightness is a display panel brightness when the display panel removes an upper polarizer and a lower polarizer at the second target position.

In an embodiment, the computing device is further configured for calculating a first display efficiency corresponding to the first target position according to brightness information of the first target position, calculating a second display efficiency corresponding to the second target position according to brightness information of the second target position, and calculating an average value of the first display efficiency and the second display efficiency to acquire the display efficiency of the display panel.

In an embodiment, the measuring device is further configured for measuring a backlight brightness and display panel brightness at the target position; and the backlight brightness is a normal brightness of a backlight, and the display panel brightness is the normal brightness emitted from the panel.

In an embodiment, the system further includes a first calculator configured for calculating a light transmittance at the target location according to the backlight brightness at the target location and the display panel brightness, and a second calculator configured for calculating a display efficiency corresponding to the target position according to the light transmittance at the target position.

In an embodiment, each circuit, chip, or device with a specific function may be implemented through a general integrated circuit, such as a Central Processing Unit (CPU), or through an Application Specific Integrated Circuit (ASIC).

In the embodiment of the present application, by determining a target position on a display panel that meets a preset condition, brightness information at the target position under a constant applied voltage may be measured, and a display efficiency of the display panel according to the brightness information may be calculated. The technical problem of the conventional display panel measuring methods requiring multiple disassembly of the module or re-attachment of the polarizers, and the measurement process being cumbersome and taking a long time, resulting in low data accuracy, low reliability, and low work efficiency is resolved when the measuring efficiency of the display panel is sped up, and the measuring accuracy of the display panel is improved.

Figure 8:
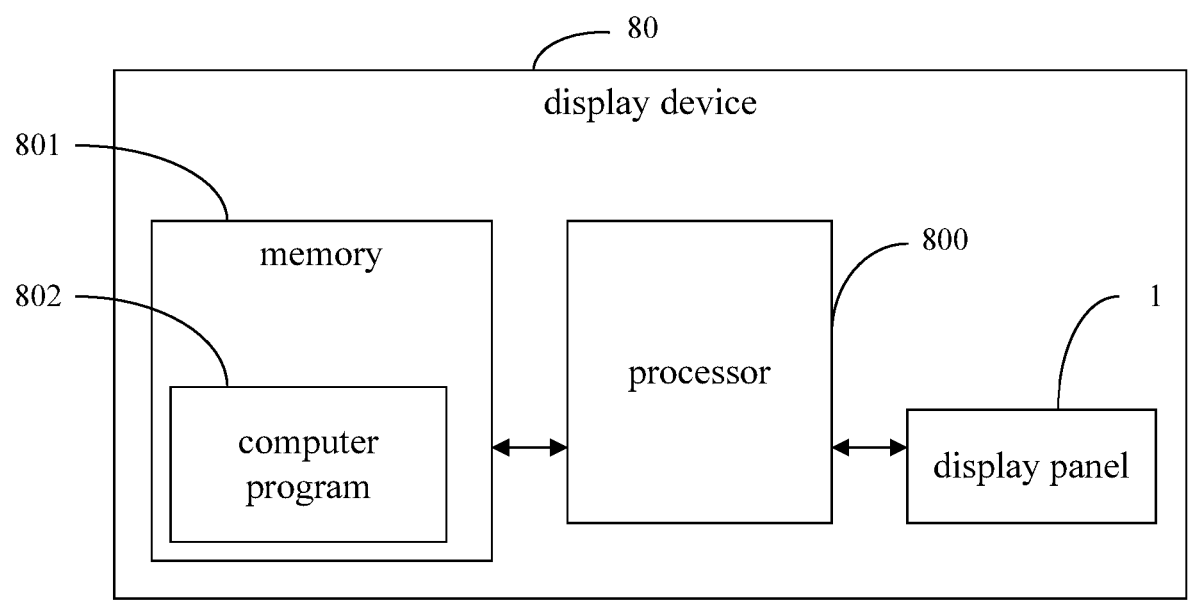
FIG. 8 is a structural block diagram of a display device provided by an embodiment of the present application.

As shown in FIG. 8, an embodiment of the present application provides a display device 80, which includes a display panel 1, a processor 800, a memory 801, and a computer program 802 stored in the memory 801 and able to operate on the processor 800. When the processor 800 executes the computer program 802, the steps in the above embodiments of each method of measuring a display panel are implemented. For example, steps S10 to S30 shown in FIG. 2, which include determining a target position on a display panel that meets a preset condition, measuring brightness information at the target position under a constant applied voltage, and calculating a display efficiency of the display panel according to the brightness information are implemented. The step of determining a target position on a display panel that meets a preset condition includes determining a first target position and a second target position on the display panel, a connecting line of the first target position and the second target position being parallel to a row of sub-pixels, and a distance between the first target position and the second target position satisfying a first condition. Alternatively, when the processor 800 executes the computer program 802, the functions of the devices in the foregoing device embodiments, for example, the functions of the positioning device 71, measuring device 72, and calculation device 73 shown in FIG. 7, are realized.

The display device 80 may include, but is not limited to, a processor 800 and a memory 801. Those skilled in the art can understand that FIG. 8 is only an example of the display device 80, and does not constitute a limitation on the display device 80. It may include more or less components than those shown in the figures, or combine certain components, or different components. For example, the display device 80 may also include input and output devices, network access devices, buses, and the like.

The types of display panels that can be measured by the measuring method of the application can be twisted-out (TN) display panels, optically compensated birefringence (OCB) display panels, vertical alignment (VA) display panels, and curved liquid crystal display devices. However, the application is not limited to only these particular panels. The liquid crystal display device can use a direct backlight, and the backlight source can be a white light, a three red, green, blue (RGB) light source, a red, green, blue, and white (RGBW) light source or a red, green, blue, yellow (RGBY) light source. Again, the application is not limited to these particular backlight sources.

The processor 800 may be a central processing unit (CPU), other general-purpose processor, digital signal processor (DSP), application specific integrated circuit (ASIC), Field-Programmable Gate Array (FPGA) or other programmable logic device, discrete gate or transistor logic device, discrete hardware component, etc. The general-purpose processor may be a microprocessor or the processor may also be any conventional processor or the like.

The memory 801 may be an internal storage unit of the display device 80, such as a hard disk or a memory of the display device 80. The memory 801 may also be an external storage device of the display device 80, such as a plug-in hard disk, a Smart Media Card (SMC), a secure digital (SD) card, Flash Card, etc. equipped on the display device 80. Further, the memory 801 may also include both an internal storage unit and an external storage device of the display device 80. The memory 801 is used to store the computer program and other programs and data required by the display device 80. The memory 801 can also be used to temporarily store data that has been or will be output.

Those skilled in the art can clearly understand that for the convenience and conciseness of the description, only the division of the above functional units and modules is used as an example. In actual applications, the above functions can be allocated to different functional units and modules to complete. That is dividing the internal structure of the device into different functional units or modules to complete all or part of the functions described above. The functional units and modules in the embodiments can be integrated into one processing unit, each unit can exist alone physically, or two or more units can be integrated into one unit. The above-mentioned integrated units can be hardware-based, but can also be realized in the form of software functional units. In addition, the specific names of the functional units and modules are only used to facilitate distinguishing between each, and are not used to limit the protection scope of the present application. For the specific working process of the units and modules in the foregoing system, reference may be made to the corresponding process in the foregoing method embodiment, which is not repeated herein.

In the above-mentioned embodiments, the description of each embodiment has its own emphasis. For parts that are not described in detail or recorded in an embodiment, reference may be made to related descriptions of other embodiments.

Those skilled in the art may be aware that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the present application.

In the embodiments provided in the present application, it should be understood that the disclosed device/terminal device and method may be implemented in other ways. For example, the device/terminal device embodiments described above are only illustrative. For example, the division of the modules or units is only a logical function division, and there may be other divisions in actual implementation, such as multiple units or components can be combined or integrated into another system, or some features can be omitted or not implemented. In addition, the displayed or discussed mutual coupling or direct coupling or communication connection may be indirect coupling or communication connection through some interfaces, devices or units, and may be in electrical, mechanical, or of other forms.

The units described as separate components may or may not be physically separated, and the components displayed as units may or may not be physical units. That is, they may be located in one place, or they may be distributed on multiple network units. Some or all of the units may be selected according to actual needs to achieve the objectives of the solutions of the embodiments.

In addition, the functional units in each embodiment of the present application may be integrated into one processing unit, each unit may exist alone physically, or two or more units may be integrated into one unit. The above-mentioned integrated unit can be implemented in the form of a hardware or software functional unit.

If the integrated module/unit is implemented in the form of a software functional unit and sold or used as an independent product, it can be stored in a computer readable storage medium. Based on this understanding, the present application implements all or part of the processes in the above-mentioned embodiments and methods, and can also be completed by instructing relevant hardware through a computer program. The computer program can be stored in a computer-readable storage medium. When the program is executed by the processor, the steps of the foregoing method embodiments can be implemented. The computer program includes computer program code, and the computer program code may be in the form of source code, object code, executable file, or some intermediate forms. The computer-readable medium may include any entity or device capable of carrying the computer program code, recording medium, U disk, mobile hard disk, magnetic disk, optical disk, computer memory, read-only memory (ROM), Random Access Memory (RAM), electrical carrier signal, telecommunications signal, and software distribution media. It should be noted that the content contained in the computer-readable medium can be appropriately added or deleted in accordance with the requirements of the legislation and patent practice in the jurisdiction. For example, in some jurisdictions, according to the legislation and patent practice, the computer-readable medium does not include electrical carrier signals and telecommunication signals.

The aforementioned embodiments are only optional embodiments of the present application, and should not be regarded as being limiting to the present application. Any modification, equivalent replacement, improvement, and so on, which are made within the spirit and the principle of the present application, should be included in the protection scope of the present application.

What is claimed is:

1. A method of measuring a display panel, comprising:
determining a target position on the display panel that meets a preset condition by determining a first target position and a second target position on the display panel, wherein a connecting line of the first target position and the second target position is parallel to a row of sub-pixels, and wherein a distance between the first target position and the second target position is within a preset distance range;
measuring a brightness information at the target position under a constant applied voltage by:
measuring a first backlight brightness and a first display panel brightness at a first target position, wherein the first backlight brightness is a backlight brightness corresponding to the first target position when a liquid crystal panel is removed, and wherein the first display panel brightness is a brightness at the first target position of the display panel when the display panel retains an upper polarizer and a lower polarizer;
measuring a second backlight brightness and a second display panel brightness at a second target position, wherein the second backlight brightness is a backlight brightness corresponding to the second target position when a liquid crystal panel is removed, and wherein the second display panel brightness is a brightness at the second target position of the display panel when the display panel retains an upper polarizer and a lower polarizer;
measuring a third display panel brightness at the first target position, wherein the third display panel brightness is measured when the display panel removes an upper polarizer at the first target position;
measuring a fourth display panel brightness at the first target position, wherein the fourth display panel brightness is measured when the display panel removes a lower polarizer at the second target position;
measuring a fifth display panel brightness at the first target position, wherein the fifth display panel brightness is measured when the display panel removes an upper polarizer and a lower polarizer at the first target position; and
measuring a sixth display panel brightness at the first target position, wherein the sixth display panel brightness is measured when the display panel removes an upper polarizer and a lower polarizer at the second target position; and
calculating a display efficiency of the display panel according to the brightness information.

2. The method of claim 1, wherein calculating the display efficiency of the display panel according to the brightness information comprises:
calculating a first display efficiency corresponding to a first target position according to brightness information of the first target position;
calculating a second display efficiency corresponding to a second target position according to brightness information of the second target position; and
calculating an average value of the first display efficiency and the second display efficiency to acquire the display efficiency of the display panel.

3. The method of claim 1, wherein calculating the display efficiency of the display panel according to the brightness information comprises:

calculating a first light transmittance according to the first backlight brightness and the first display panel brightness;
calculating a second light transmittance according to the first backlight brightness and the third display panel brightness;
calculating a third light transmittance according to the second backlight brightness and the fourth display panel brightness;
calculating a fourth light transmittance according to the first backlight brightness and the fifth display panel brightness;
calculating a fifth light transmittance according to the second backlight brightness and the second display panel brightness;
calculating a sixth light transmittance according to the second backlight brightness and the sixth display panel brightness;
calculating the display efficiency corresponding to the first target position according to the first light transmittance, the second light transmittance, the third light transmittance, and the fourth light transmittance;
calculating the display efficiency corresponding to the second target position according to the fifth light transmittance, the second light transmittance, the third light transmittance, and the sixth light transmittance; and
calculating the display efficiency of the display panel according to the display efficiency corresponding to the first target position and the display efficiency corresponding to the second target position.

4. The method of claim 3, wherein a first calculating formula for use in calculating the display efficiency corresponding to the first target position according to the first light transmittance, the second light transmittance, the third light transmittance, and the fourth light transmittance is:

$$\eta_{LC,1} = \frac{T_1 \times T_4}{T_2 \times T_3 \times 2},$$

wherein $\eta_{LC,1}$ represents the display efficiency corresponding to the first target position, $T_1$ represents the first light transmittance, $T_2$ represents the second light transmittance, $T_3$ represents the third light transmittance, and $T_4$ represents the fourth light transmittance, wherein a second calculating formula for use in calculating the display efficiency corresponding to the second target position according to the fifth light transmittance, the second light transmittance, the third light transmittance, and the sixth light transmittance is:

$$\eta_{LC,2} = \frac{T_5 \times T_6}{T_2 \times T_3 \times 2},$$

wherein $\eta_{LC,2}$ represents the display efficiency corresponding to the second target position, $T_5$ represents the fifth light transmittance, $T_2$ represents the second light transmittance, $T_3$ represents the third light transmittance, and $T_6$ represents the sixth light transmittance, wherein a third calculating formula for use in calculating the display efficiency of the display panel according to the display efficiency corresponding to the first target position and the display efficiency corresponding to the second target position is:

$$\eta_{LC} = \frac{\eta_{LC,1} + \eta_{LC,2}}{2},$$

and
wherein $\eta_{LC}$ represents the display efficiency of the display panel.

5. The method of claim 1, wherein measuring the brightness information at the target position under the constant applied voltage comprises measuring a backlight brightness and a display panel brightness at the target position.

6. The method of claim 5, wherein after measuring the backlight brightness and the display panel brightness at the target position, the method further comprises:
calculating a light transmittance at the target position according to the backlight brightness and the display panel brightness at the target position; and
calculating the display efficiency corresponding to the target position according to the light transmittance at the target position.

7. The method of claim 5, wherein the backlight brightness is a normal brightness of a backlight, wherein the normal brightness of the backlight is a light emission in a direction perpendicular to a plane of the backlight, and wherein the display panel brightness is a brightness produced by an emitted light perpendicular to the display panel.

8. The method of claim 1, wherein the target position comprises:
a point at a center of the display panel, two points at a first distance from the center, or four points at a second distance from the center; and
a connecting line of the two points or the four points is parallel to a row of sub-pixels.

9. The method of claim 1, wherein before measuring the brightness information at the target position under a constant applied voltage, the method further comprises:
marking a center of the display panel;
fixing and recording a distance of the target position relative to the center of the display panel; and
setting a preset constant time until a backlight brightness is stabilized.

10. The method of claim 1, wherein the measuring method further comprises:
determining a first target position and a second target position on the display panel, wherein a distance between the first target position and the second target position is within a preset distance range;
measuring a backlight brightness of the first target position and a first display panel brightness under a constant applied voltage;
measuring a backlight brightness and a second display panel brightness at the second target position under a constant applied voltage;
calculating a light transmittance at the first target position according to the backlight brightness and the first display panel brightness of the first target position;
calculating a light transmittance at the second target position according to the backlight brightness and the display panel brightness of the second target position; and
calculating the display efficiency of the display panel according to the light transmittance at the first target position and the light transmittance at the second target position.

11. A system of measuring a display panel, comprising:
a position selection device configured for determining a target position on a display panel that meets a preset condition by determining a first target position and a second target position on the display panel, wherein a connecting line the first target position and the second target position is parallel to a row sub-pixels, and wherein a distance between the first target position and the second target position is within a preset distance range;

a luminance meter configured for measuring brightness information at the target position under a constant applied voltage by:

measuring a first backlight brightness and a first display panel brightness at the first target position, wherein the first backlight brightness is a backlight brightness corresponding to the first target position when a liquid crystal panel is removed, and wherein the first display panel brightness is a brightness at the first target position of the display panel when the display panel retains an upper polarizer and a lower polarizer;

measuring a second backlight brightness and a second display panel brightness at the second target position, wherein the second backlight brightness is a backlight brightness corresponding to the second target position when a liquid crystal panel is removed, and wherein the second display panel brightness is a brightness at the second target position of the display panel when the display panel retains an upper polarizer and a lower polarizer;

measuring a third display panel brightness at the first target position, wherein the third display panel brightness is measured when the display panel removes an upper polarizer at the first target position;

measuring a fourth display panel brightness at the first target position, wherein the fourth display panel brightness is measured when the display panel removes a lower polarizer at the second target position;

measuring a fifth display panel brightness at the first target position, wherein the fifth display panel brightness is measured when the display panel removes an upper polarizer and a lower polarizer at the first target position; and measuring a sixth display panel brightness at the first target position, wherein the sixth display panel brightness is measured when the display panel removes an upper polarizer and a lower polarizer at the second target position; and a processor configured for calculating a display efficiency of the display panel according to the brightness information.

12. The system of claim 11, wherein the processor is further configured for:

calculating a first display efficiency corresponding to the first target position according to brightness information of the first target position;

calculating a second display efficiency corresponding to the second target position according to brightness information of the second target position; and calculating an average value of the first display efficiency and the second display efficiency to acquire the display efficiency of the display panel.

13. The system of claim 11, wherein the luminance meter is further configured for measuring a backlight brightness and a display panel brightness at the target position, wherein the backlight brightness is a normal brightness of a backlight, and wherein the display panel brightness is the normal brightness emitted from the display panel.

14. The system of claim 13, wherein the system further comprises:

a first calculator configured for calculating a light transmittance at the target position according to the backlight brightness and the display panel brightness at the target position; and a second calculator configured for calculating a display efficiency corresponding to the target position according to the light transmittance at the target position.

15. A display device, comprising:

a display panel;

a memory;

a processor coupled to the display panel and the memory; and a computer program stored in the memory and operating on the processor, wherein the processor performs the following operations when calling the computer program:

determining a target position on the display panel that meets a preset condition by determining a first target position and a second target position on the display panel, wherein a connecting line of the first target position and the second target position is parallel to a row of sub-pixels, and wherein a distance between the first target position and the second target position is within a preset distance range;

measuring a brightness information at the target position under a constant applied voltage by:

measuring a first backlight brightness and a first display panel brightness at a first target position, wherein the first backlight brightness is a backlight brightness corresponding to the first target position when a liquid crystal panel is removed, and wherein the first display panel brightness is a brightness at the first target position of the display panel when the display panel retains an upper polarizer and a lower polarizer;

measuring a second backlight brightness and a second display panel brightness at a second target position, wherein the second backlight brightness is a backlight brightness corresponding to the second target position when a liquid crystal panel is removed, and wherein the second display panel brightness is a brightness at the second target position of the display panel when the display panel retains an upper polarizer and a lower polarizer;

measuring a third display panel brightness at the first target position, wherein the third display panel brightness is measured when the display panel removes an upper polarizer at the first target position;

measuring a fourth display panel brightness at the first target position, wherein the fourth display panel brightness is measured when the display panel removes a lower polarizer at the second target position;

measuring a fifth display panel brightness at the first target position, wherein the fifth display panel brightness is measured when the display panel removes an upper polarizer and a lower polarizer at the first target position; and measuring a sixth display panel brightness at the first target position, wherein the sixth display panel brightness is measured when the display panel removes an upper polarizer and a lower polarizer at the second target position; and calculating a display efficiency of the display panel according to the brightness information.

* * * * *